United States Patent
Huo et al.

(10) Patent No.: US 9,307,571 B2
(45) Date of Patent: Apr. 5, 2016

(54) COMMUNICATION DEVICE AND FREQUENCY OFFSET CALIBRATING METHOD

(71) Applicant: MediaTek Singapore Pte. Ltd., Singapore (SG)

(72) Inventors: Yueheng Huo, Beijing (CN); Wenze Qu, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 73 days.

(21) Appl. No.: 14/195,027

(22) Filed: Mar. 3, 2014

(65) Prior Publication Data

US 2015/0131543 A1 May 14, 2015

(30) Foreign Application Priority Data

Nov. 8, 2013 (CN) .......................... 2013 1 0552018

(51) Int. Cl.
*H04W 76/04* (2009.01)
*H04W 52/02* (2009.01)

(52) U.S. Cl.
CPC ............ *H04W 76/048* (2013.01); *H04W 52/02* (2013.01)

(58) Field of Classification Search
None
See application file for complete search history.

(56) References Cited

U.S. PATENT DOCUMENTS

| 8,135,553 | B2 | 3/2012 | Yang et al. |
| 2012/0190373 | A1* | 7/2012 | Tenny ........................... 455/447 |
| 2012/0236920 | A1 | 9/2012 | Ben-Eli |
| 2013/0095879 | A1* | 4/2013 | Gupta et al. .................. 455/525 |
| 2013/0150112 | A1* | 6/2013 | Qi et al. ........................ 455/515 |
| 2013/0203452 | A1* | 8/2013 | Awoniyi et al. ............... 455/500 |
| 2014/0348094 | A1* | 11/2014 | Charbit et al. ................ 370/329 |
| 2015/0063095 | A1* | 3/2015 | Deng et al. .................... 370/221 |

FOREIGN PATENT DOCUMENTS

TW    I386087    2/2013

* cited by examiner

*Primary Examiner* — Kerri Rose
(74) *Attorney, Agent, or Firm* — McClure, Qualey & Rodack, LLP

(57) ABSTRACT

A frequency offset calibrating method for use in a communication device connected to a communication system is provided. The method includes the following steps: determining a discontinuous reception cycle; awakening the communication device to a working mode from a sleep mode every discontinuous reception cycle and keep the communication device in the working mode for a first time period to receive a paging indication channel message from a communication network periodically; and awakening the communication device at a second time period other than the first time period during a first discontinuous reception cycle, thereby estimating an accumulated timing offset of a clock signal of the communication device and calibrating a frequency offset of the clock signal. In the invention, the accumulated timing offset of the clock signal can be calibrated efficiently to increase the reception performance of the page indication channel message with simple implementation and low hardware cost.

12 Claims, 3 Drawing Sheets

COMMUNICATION DEVICE AND FREQUENCY OFFSET CALIBRATING METHOD

CROSS REFERENCE TO RELATED APPLICATIONS

This Application claims priority of China Patent Application No. 201310552018.8, filed on Nov. 8, 2013, the entirety of which is incorporated by reference herein.

BACKGROUND OF THE INVENTION

1. Field of the Invention

The present invention relates to a wireless communication device, and in particular to a communication device and method of calibrating frequency offset by awakening the communication device from a sleep mode to a working mode periodically.

2. Description of the Related Art

In a communication system, for example, a TD-SCDMA communication system, a conventional communication device in sleep mode should be awakened into working mode periodically, such as every discontinuous reception (DRX) cycle, to receive page indication channel (PICH) message. However, the conventional communication device is awakened into working mode at the end of each DRX cycle. Since there may be a frequency offset in the clock signal, the communication device maybe unable to be awakened to receive the PICH message within the time range defined in the communication standard. Conventionally, there are two methods to solve the aforementioned problem. In the first method, the communication device may be awakened at the end of each DRX cycle to estimate the accumulated timing offset, and calibrates the frequency offset of the clock signal (e.g. 32 KHz) according to the estimated accumulated timing offset; while in the second method, a high accuracy clock signal (e.g. 26 MHz) could be used to calibrate the clock signal of 32 KHz. However, the aforementioned methods may have some disadvantages. For example, in the first method, when a longer DRX cycle is used or the frequency offset of the 32 KHz clock signal is too large, the accumulated frequency offset may be too large that it exceeds the estimation capability of the conventional communication device, so that the communication device cannot estimate and calibrate the accumulated timing offset properly, resulting in low PICH reception performance; and regarding the second method, an additional calibrating mechanism is required, resulting in higher system complexity. Accordingly, a communication system is demanded to solve the frequency offset calibration issue when the communication system is in the sleep mode (or the idle mode).

BRIEF SUMMARY OF THE INVENTION

A detailed description is given in the following embodiments with reference to the accompanying drawings.

A frequency offset calibrating method for use in a communication device connected to a communication system is provided. The method includes the following steps: determining a discontinuous reception cycle; periodically awakening the communication device to a working mode from a sleep mode every discontinuous reception cycle and keep the communication device in the working mode for a first time period to receive a paging indication channel message from a communication network; and awakening the communication device at a second time period other than the first time period during a first discontinuous reception cycle, thereby estimating an accumulated timing offset of a clock signal of the communication device and calibrating a frequency offset of the clock signal. In the invention, the accumulated timing offset of the clock signal can be calibrated efficiently to increase the reception performance of the page indication channel message with simple implementation and low hardware cost.

A communication device is provided. The communication device includes a processor, configured to determine a discontinuous reception cycle; and a control unit, configured to awaken the communication device to a working mode from a sleep mode every discontinuous reception cycle and keep the communication device in the working mode for a first time period to receive a paging indication channel message from a communication network periodically, wherein the control unit further awakens the communication device at a second time period other than the first time period during a first discontinuous reception cycle, thereby estimating an accumulated timing offset of a clock signal of the communication device and calibrating a frequency offset of the clock signal.

In the invention, the accumulated timing offset of the clock signal can be calibrated efficiently to increase the reception performance of the page indication channel message with simple implementation and low hardware cost.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
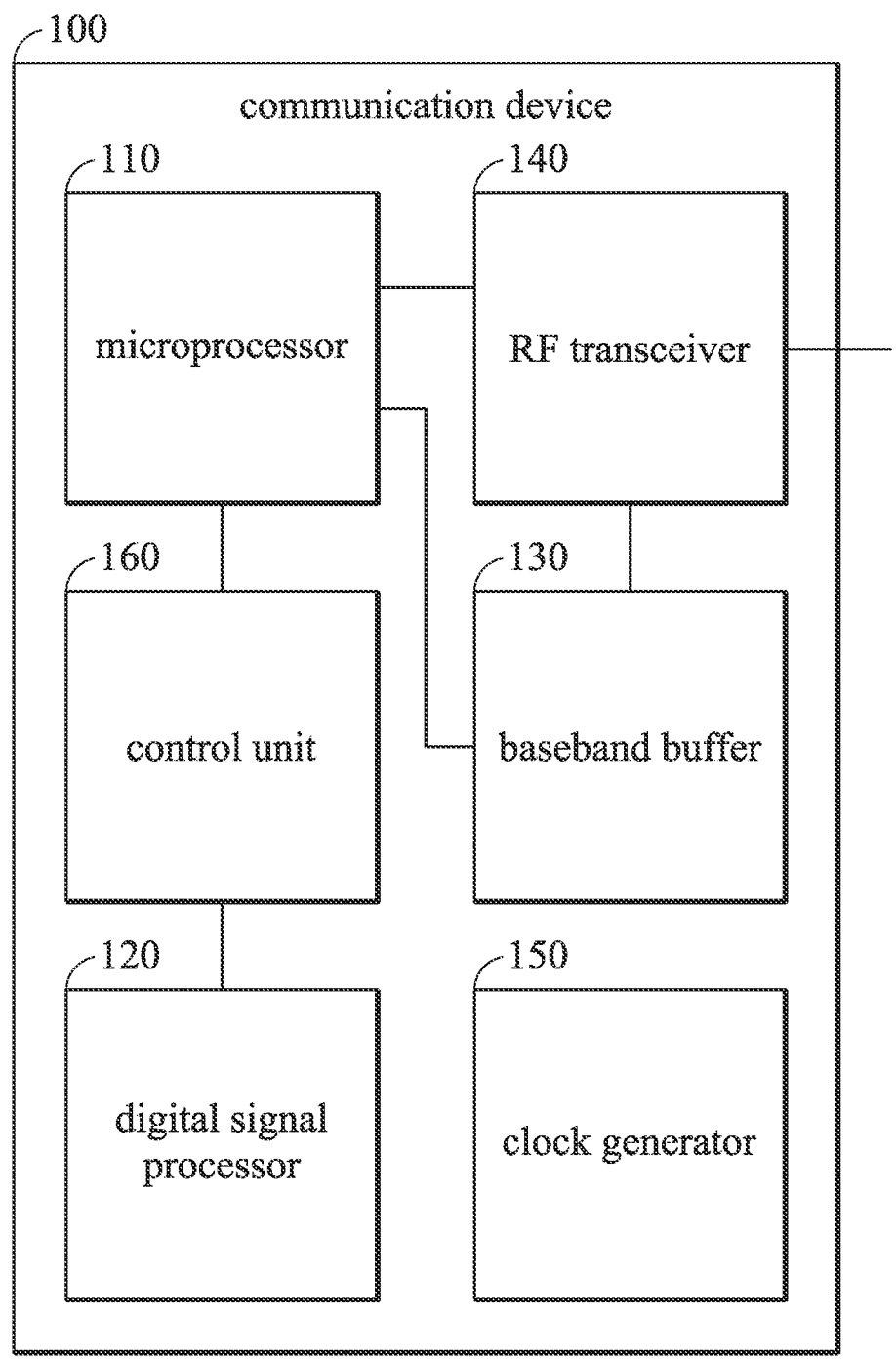
FIG. 1 is a schematic block diagram of a communication device 100 in accordance with an embodiment of the invention.

FIG. 1 is a schematic block diagram of a communication device 100 in accordance with an embodiment of the invention. As illustrated in FIG. 1, the communication device 100 may include a microprocessor (MCU) 110, a digital signal processor (DSP) 120, a baseband buffer 130, an RF transceiver 140, a clock generator 150, and a control unit 160. In a communication system, the communication device 100 is connected to a communication network to transmit/receive packet data via the RF transceiver 140. The MCU 110 and the DSP 120 are configured to process the packet data transferred by the communication device 100, and the MCU 110 may further determine a DRX cycle at the sleep mode. The baseband buffer 130 is configured to store the packet data to be transmitted or received by the RF transceiver 140. In an embodiment, the communication device 100 can be regarded as user equipment (UE), such as a handheld device (e.g. mobile phone, personal digital assistant, etc.), which supports communication standards such as TD-SCDMA, WCDMA, or CDMA2000. The clock generator 150 may generate clock signals required in each component of the communication device 100 according to the control command from the MCU 110 or the DSP 120. For example, the clock generator 150 can be implemented by a phase-locked loop (PLL) or an oscillator to generate a stable reference clock signal $CLK_{ref}$ (e.g. 26 MHz), and generate a clock signal $CLK_A$ (e.g. 32 KHz) to be used in the sleep mode for the communication device 100 based on the reference clock signal $CLK_{ref}$. The control unit 160 is configured to control activation/deactivation of other components of the communication device 100. In an embodiment, the control unit 160 may include at least one counter coupled to the clock signal $CLK_A$, configured to count the number of clock cycles required to awake the communication device 100 to the working mode, and the number of clock cycles required in the sleep/idle time, thereby awakening other components of the communication device 100 or controlling other components of the communication device 100 to enter the sleep mode.

Figure 2:
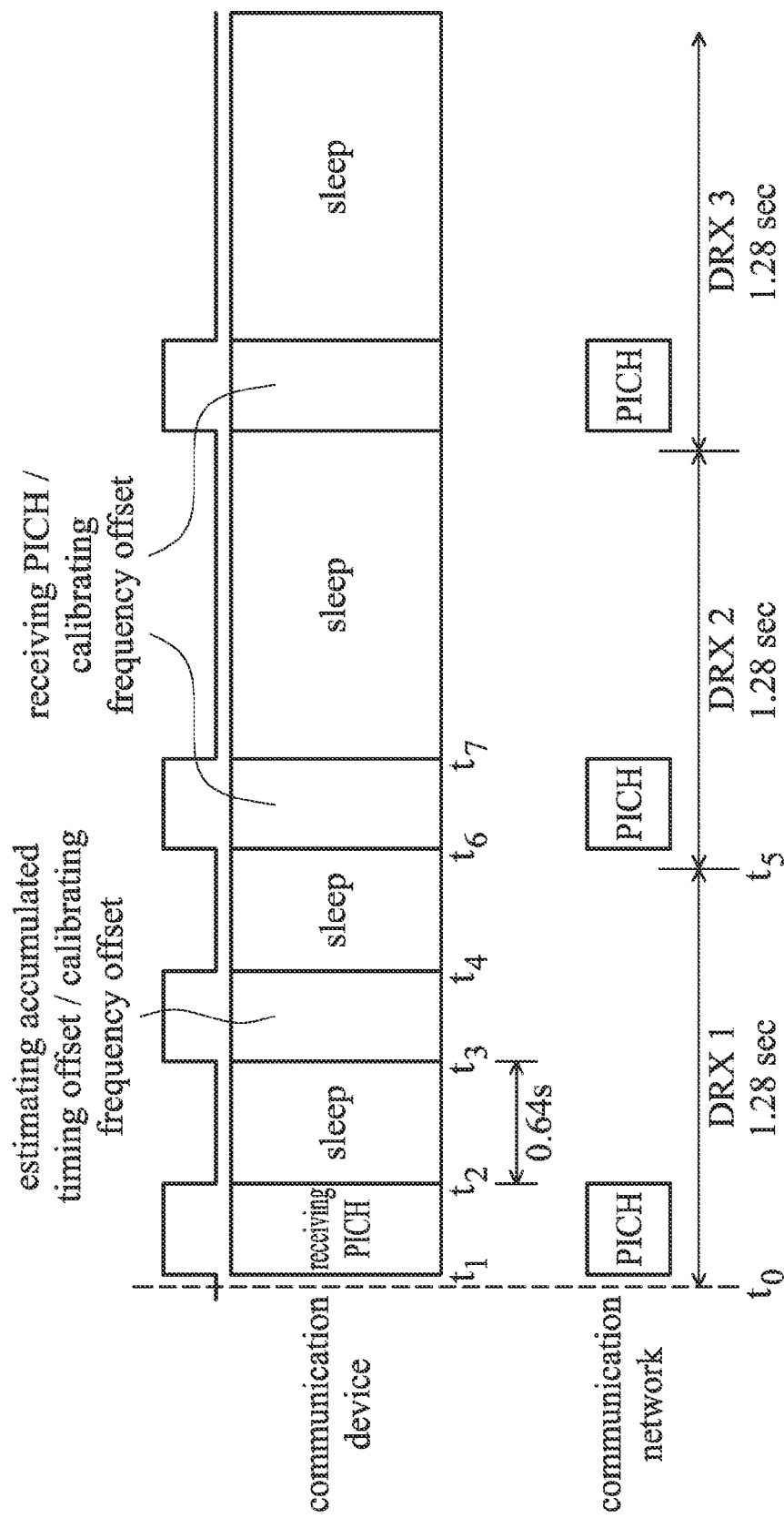
FIG. 2 is a diagram illustrating the communication device 100 being awakened periodically in accordance with an embodiment of the invention.

FIG. 2 is a timing diagram illustrating the communication device 100 being awakened periodically in accordance with an embodiment of the invention. Taking a TD-SCDMA communication system for example, in order to reduce power consumption, the communication device may be in idle mode (i.e. except the clock generator 150), and the primary components (e.g. MCU 110, DSP 220, baseband buffer 130, and the RF transceiver 140) of the communication device 100 would be awakened into working mode by the control unit 160 to receive the PICH message at each DRX cycle. The sleep time of the communication device 100 is calculated with the clock signal $CLK_A$ having a lower frequency (e.g. 32 KHz) to, and the clock signal $CLK_A$ is usually obtained by dividing frequency of a stable reference clock signal $CLK_{ref}$ (e.g. 26 MHz) generated by a phase-locked loop device or an oscillator. However, the frequency offset X may happen to the clock signal $CLK_A$ with lower frequency due to the temperature drift. When calculating a fixed time interval, for example, after a time interval of L (L≥0) clock cycles (i.e. L*X/(32K)), the timing offset in each clock cycle will be accumulated, resulting in the components of the communication device 100 being unable to be awakened within the time range defined by the communication standard. Accordingly, the clock signal $CLK_A$ should be calibrated.

In one embodiment of the invention, the awakening time of the communication device 100 during each DRX cycle at the sleep mode may be an adjustable number of clock cycles, such as N clock cycles. A conventional communication device may stay in the idle mode during the each DRX cycle, and the timing offset of the clock signal $CLK_A$ will not be estimated and compensated until the communication device 100 is awakened into working mode by the end of each DRX cycle. However, when a longer DRX cycle is used or the frequency offset of the clock signal $CLK_A$ is large, the accumulated timing offset may exceed the tolerance range used in the conventional communication device (e.g. ±0.1 ms), resulting in the conventional communication device being unable to receive the PICH message at the correct time, and the PICH reception performance may reduce due to loss of PICH messages.

In one embodiment of the invention, the communication device 100 can be awakened actively in each sleep cycle to estimate accumulated timing offset and calibrate the frequency offset of the clock signal. As illustrated in FIG. 2, the frequency offset calibrating method may include the following steps: (1) when the communication device enters the sleep mode, if the DRX cycle being used is long (e.g. 1.28 seconds), after the communication device 100 enters sleep mode at the first cycle DRX 1, the control unit 160 may actively awaken the communication device 100 to enter the working mode to estimate the accumulated timing offset after a predetermined time period (e.g. approximate ½ DRX cycle). For example, at time $t_0$, the communication device 100 enters the sleep mode, and starts counting for the DRX cycle. However, during the period from time $t_1$ to $t_2$ (e.g. N clock cycles of the clock signal $CLK_A$), the communication device is awakened into the working mode by the control unit 160 to receive the PICH message. Afterwards, the communication device may go back to the idle mode at time $t_2$ from the working mode after N (i.e. N≥0) clock cycles from time $t_1$. At time $t_3$, components of the communication device 100 except the MCU 110 may be awakened by the control unit 160 to estimate the accumulated timing offset and calibrate the frequency offset after approximately ½ DRX cycle (e.g. 0.64 sec) from time $t_2$. It should be noted that the aforementioned ½ DRX cycle is only an example and the invention is not limited thereto. Furthermore, in some embodiments, the MCU 110 and the DSP 120 can be integrated into a processor.

(2) At time $t_3$, the DSP 120 can calculate the current frequency offset of the clock signal $CLK_A$ (e.g. 32 KHz). When the frequency offset caused by the clock signal $CLK_A$ is obtained, the DSP 120 may calibrate the frequency of the clock signal $CLK_A$ generated by the clock generator 150 according to the calculated frequency offset. Specifically, the frequency of the clock signal $CLK_A$ is obtained by dividing frequency of the reference clock signal $CLK_{ref}$ by a phase-locked loop or a frequency calibrator, and the DSP 120 may calibrate the ratio for dividing frequency of the reference clock signal, and an accurate clock frequency can be obtained by the calibration.

(3) After M clock cycles from time $t_3$, the communication device 100 enters the idle mode again at time $t_4$ to wait for reception of the PICH message.

(4) At the subsequent DRX cycles (e.g. DRX 2 or DRX 3), the communication device 100 may receive the PICH message regularly. Specifically, since the frequency of the clock signal $CLK_A$ has been calibrated during the period from time $t_3$ to $t_4$, the communication device 100 can be awakened correctly at time $t_6$ to receive the PICH message. It should be noted that the communication device 100 can be also awakened from the sleep mode actively at other DRX cycles in addition to the first DRX cycle depending on the practical situation, and the details can be referred to FIG. 3.

Figure 3:
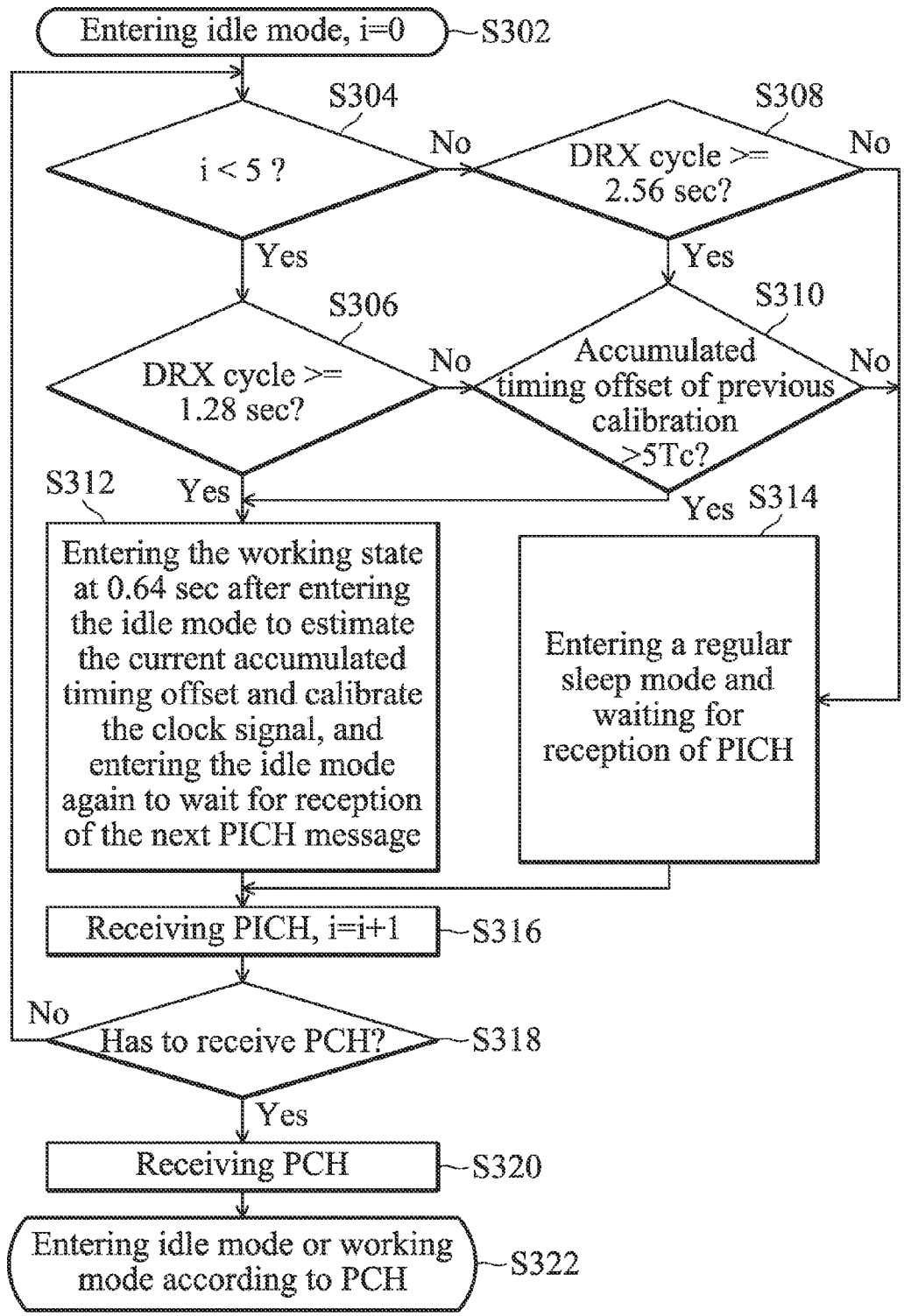
FIG. 3 is a flow chart illustrating the frequency offset method in accordance with an embodiment of the invention.

FIG. 3 is a flow chart illustrating the frequency offset calibrating method in accordance with an embodiment of the invention. In step S302, the communication device 100 enters the idle mode. It should be noted that the communication device 100 has not started to calculate the DRX cycle yet, wherein i denotes the number of DRX cycles passed. In step S304, it is determined whether the current DRX cycle is one of the first four DRX cycles. If so, step S306 is performed. Otherwise, step S308 is performed. In step S306, it is determined whether the DRX cycle is larger than or equal to a predefined DRX cycle (e.g. 1.28 sec). If so, step S312 is performed. Otherwise, step S310 is performed. In step S308, it is determined whether the DRX cycle is longer than or equal to a second DRX cycle, wherein the second DRX cycle (e.g 2.56 seconds in the embodiment) is larger than the first DRX cycle. If so, step S310 is performed. Otherwise, step S314 is performed.

In step S310, it is determined whether the accumulated timing offset of the previous frequency offset calibration is larger than a threshold value such as 5Tc, wherein Tc denotes the chip period of the TD-SCDMA communication system (e.g. 1/(1.28 MHz)). If so, step S312 is performed. Otherwise, step S314 is performed. In step S312, the communication device 100 enters the working state at ½ DRX cycle (e.g. 0.64 sec) after entering the idle mode in order to estimate the current accumulated timing offset and calibrate the clock signal $CLK_A$ (e.g. 32 KHz), and then enters the idle mode again to wait for reception of the PICH message. In step S314, the communication device 100 enters a regular sleep mode to wait for reception of next PICH message. In step S316, when the communication device 100 has received the PICH message, the counter of DRX cycles is increased by 1. In step S318, it is determined whether the communication device 100 has to receive the paging channel (PCH) message. If so, step S320 is performed. Otherwise, step S304 is performed. In step S320, the communication device 100 receives the PCH message. In step S322, the communication device 100 enters the idle mode or the working mode according to the PCH message.

In view of the above, the communication device and the frequency offset calibrating method of the invention are capable of calibrating periodical sleep timing information by calibrating the accumulated timing offset generated by the clock signal in time, thereby increasing the reception performance of the PICH message with simple implementation and low hardware cost.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A communication device, comprising
   a processor, configured to determine a discontinuous reception cycle; and
   a control unit, configured to awaken the communication device to a working mode from a sleep mode in the discontinuous reception cycle and keep the communication device in the working mode for a first time period to receive a paging indication channel message from a communication network,
   wherein the control unit further determines whether the discontinuous reception cycle is larger than or equal to a first cycle, wherein when the discontinuous reception cycle is longer than or equal to the first period, the control unit further awakens the communication device at a second time period other than the first time period during the discontinuous reception cycle, thereby estimating an accumulated timing offset of a clock signal of the communication device and calibrating a frequency offset of the clock signal.

2. The communication device as claimed in claim 1, wherein the control unit further awakens the communication device during the second time period of the discontinuous reception cycle after the communication device has been in the sleep mode for a predetermined time period.

3. The communication device as claimed in claim 1, wherein the clock signal is obtained by dividing frequency of a reference clock signal of the communication device.

4. The communication device as claimed in claim 1, wherein when the discontinuous reception cycle is smaller than the first cycle, the control unit further determines whether the accumulated timing offset of previous frequency offset calibration is larger than a threshold value,
   if so, the control unit further awakens the communication device at the second time period other than the first time period, thereby estimating the accumulated timing offset of the clock signal and calibrating the frequency offset of the clock signal;
   if not, the control unit further controls the communication device to enter a regular sleep mode to wait for reception of paging indication channel message from the communication network.

5. The communication device as claimed in claim 1, wherein the control unit further determines whether the processor has to receive a paging channel message from the communication network, wherein when the processor has to receive the paging channel message, the control unit further controls the communication device to enter the working mode or the sleep mode.

6. The communication device as claimed in claim 1, wherein the discontinuous reception cycle is one of the first four discontinuous reception cycles of the communication device.

7. A frequency offset calibrating method for use in a communication device, the method comprising:
   determining a discontinuous reception cycle;
   awakening the communication device to a working mode from a sleep mode in a discontinuous reception cycle and keep the communication device in the working mode for a first time period to receive a paging indication channel message from a communication network; and
   determining whether the discontinuous reception cycle is larger than or equal to a first cycle; and
   when the discontinuous reception cycle is larger than or equal to the first period, awakening the communication device at a second time period other than the first time period during the discontinuous reception cycle, thereby estimating an accumulated timing offset of a clock signal of the communication device and calibrating a frequency offset of the clock signal.

8. The frequency offset calibrating method as claimed in claim 7, further comprising:
   awakening the communication device during the second time period of the discontinuous reception cycle after the communication device has been in the sleep mode for a predetermined time period.

9. The frequency offset calibrating method as claimed in claim 7, wherein the clock signal is obtained by dividing frequency of a reference clock signal of the communication device.

10. The frequency offset calibrating method as claimed in claim 7, further comprising:
    when the discontinuous reception cycle is shorter than the first cycle, determining whether the accumulated timing offset of previous frequency offset calibration is greater than a threshold value,
    if so, awakening the communication device at the second time period other than the first time period, thereby estimating the accumulated timing offset of the clock signal and calibrating the frequency offset of the clock signal;
    if not, controlling the communication device to enter a regular sleep mode to wait for reception of paging indication channel message from the communication network.

11. The frequency offset calibrating method as claimed in claim 7, further comprising:
    determining whether the processor has to receive a paging channel message from the communication network; and when the processor has to receive the paging channel message, controlling the communication device to enter the working mode or the sleep mode.

12. The frequency offset calibrating method as claimed in claim 7, wherein the discontinuous reception cycle is one of the first four discontinuous reception cycles of the communication device.

* * * * *